(12) United States Patent
LeMieux

(10) Patent No.: US 7,217,091 B2
(45) Date of Patent: May 15, 2007

(54) METHODS AND APPARATUS FOR DEICING AIRFOILS OR ROTOR BLADES

(75) Inventor: David Lawrence LeMieux, Tehachapi, CA (US)

(73) Assignee: General Electric Company, Schenectady, NY (US)

( * ) Notice: Subject to any disclaimer, the term of this patent is extended or adjusted under 35 U.S.C. 154(b) by 94 days.

(21) Appl. No.: 10/895,255

(22) Filed: Jul. 20, 2004

(65) Prior Publication Data

US 2006/0018752 A1    Jan. 26, 2006

(51) Int. Cl.
F03D 9/00    (2006.01)
F03B 13/00   (2006.01)

(52) U.S. Cl. .................. 416/95; 416/96 A; 415/905
(58) Field of Classification Search .................. 416/95, 416/96 A, 224; 415/119, 905, 908
See application file for complete search history.

(56) References Cited

U.S. PATENT DOCUMENTS

| | | | | |
|---|---|---|---|---|
| 1,899,689 A | * | 2/1933 | Houston | ............. 416/90 R |
| 2,449,457 A | * | 9/1948 | Dean | ............. 244/134 B |
| 2,576,487 A | * | 11/1951 | Stanley | ............. 244/134 C |
| 4,976,397 A | * | 12/1990 | Rudolph et al. | ......... 244/134 B |
| 5,660,527 A | | 8/1997 | Deering et al. | |
| 5,823,474 A | * | 10/1998 | Nunnally | ............. 244/134 E |
| 6,068,446 A | | 5/2000 | Tangler et al. | |
| 6,612,810 B1 | | 9/2003 | Olsen et al. | |
| 6,676,122 B1 | * | 1/2004 | Wobben | ............. 415/119 |

FOREIGN PATENT DOCUMENTS

CA    2228145 C  *  11/2003

* cited by examiner

Primary Examiner—Igor Kershteyn
(74) Attorney, Agent, or Firm—James E. McGinness, Esq.; Armstrong Teasdale LLP

(57) ABSTRACT

A method for deicing a rotor blade having a blade root, a blade tip, and a leading edge in which the rotor blade is operably coupled to a hub of a turbine includes circulating heated air through an outflow channel from the blade root towards the blade tip, recirculating the heated air via a return channel from the blade tip to the blade root, whereupon the recirculated heated air becomes returned air, and reheating the returned air for further circulation.

23 Claims, 5 Drawing Sheets

METHODS AND APPARATUS FOR DEICING AIRFOILS OR ROTOR BLADES

BACKGROUND OF THE INVENTION

This invention relates generally to wind turbines, and more specifically to methods and apparatus for increasing the efficiency of wind turbines.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having one or more blades. The rotor is mounted on a housing or nacelle, which is positioned on top of a truss or tubular tower. The turbine's blades transform wind energy into a rotational torque or force that drives one or more generators, rotationally coupled to the rotor through a gearbox. The gearbox steps up the inherently low rotational speed of the turbine rotor for the generator to efficiently convert mechanical energy to electrical energy, which is fed into a utility grid. Gearless direct drive turbines also exist.

Under some atmospheric conditions, the rotor blades become covered with ice. Ice buildup typically occurs on the leading edge of the airfoil and causes a reduced lifting capability. As the ice layer becomes increasingly thick, weight is added to the airfoil so that the lifting airfoil surface becomes modified. For air turbines, this modification can result in diminished aerodynamic rotor blade performance. (For airfoils on airplanes, a similar loss in performance can result in a crash.)

Airfoils or rotor blades can be difficult to service due to their operating environment. Installing resistive heating wires or other electrical conductors onto the leading edge of an airfoil can provide a conduit for lightning that renders the airfoil useless. In at least one known technique for reducing icing, an inflatable air bladder has been bonded to the leading edge of airfoils. However, inflation of the air bladder alters the aerodynamics of the airfoil or rotor blade, and the air bladder itself may be or become subject to fatigue and failure in at least some environments.

BRIEF DESCRIPTION OF THE INVENTION

There is therefore provided, in some aspects of the present invention, a method for deicing a rotor blade having a blade root, a blade tip, and a leading edge. The rotor blade is operably coupled to a hub of a turbine. The method includes circulating heated air through an outflow channel from the blade root towards the blade tip, recirculating the heated air via a return channel from the blade tip to the blade root, whereupon the recirculated heated air becomes returned air, and reheating the returned air for further circulation.

In other aspects of the present invention, there is provided a deicing apparatus that includes a turbine or engine having a hub, a rotor blade operably coupled to the turbine or engine and having blade root, a leading edge, a tip, an outflow channel therein from the blade root to the blade tip, and a return channel from the blade tip to the blade root. The return channel is configured to recirculate air flowing through the outflow channel back the to blade root. The deicing apparatus also includes a heater configured to direct heated air through the outflow channel and to reheat the recirculated air.

In another aspect, the present invention provides a wind turbine having a rotor. The rotor has at least one blade. The wind turbine also has a thermal camera system including a thermal camera that is configured to detect thermal radiation from a leading edge of the rotor blade to determine whether icing exists on the leading edge of the rotor blade.

It will be appreciated that configurations of the present invention provide effective detection of ice on rotor blades and/or effective deicing of rotor blades.

DETAILED DESCRIPTION OF THE INVENTION

Figure 1:
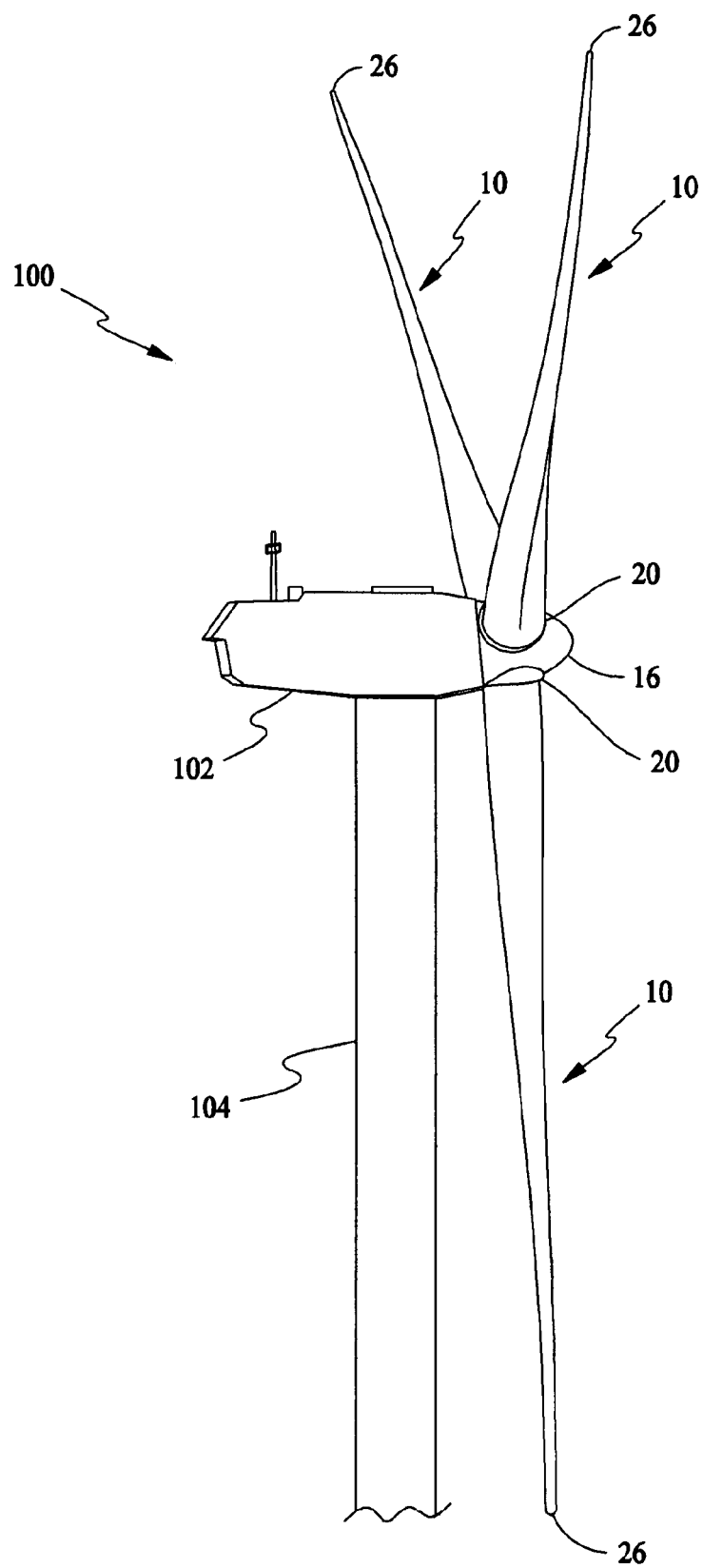
FIG. 1 is a drawing of an exemplary wind turbine in which a configuration of the present invention may be utilized.
Figure 2:
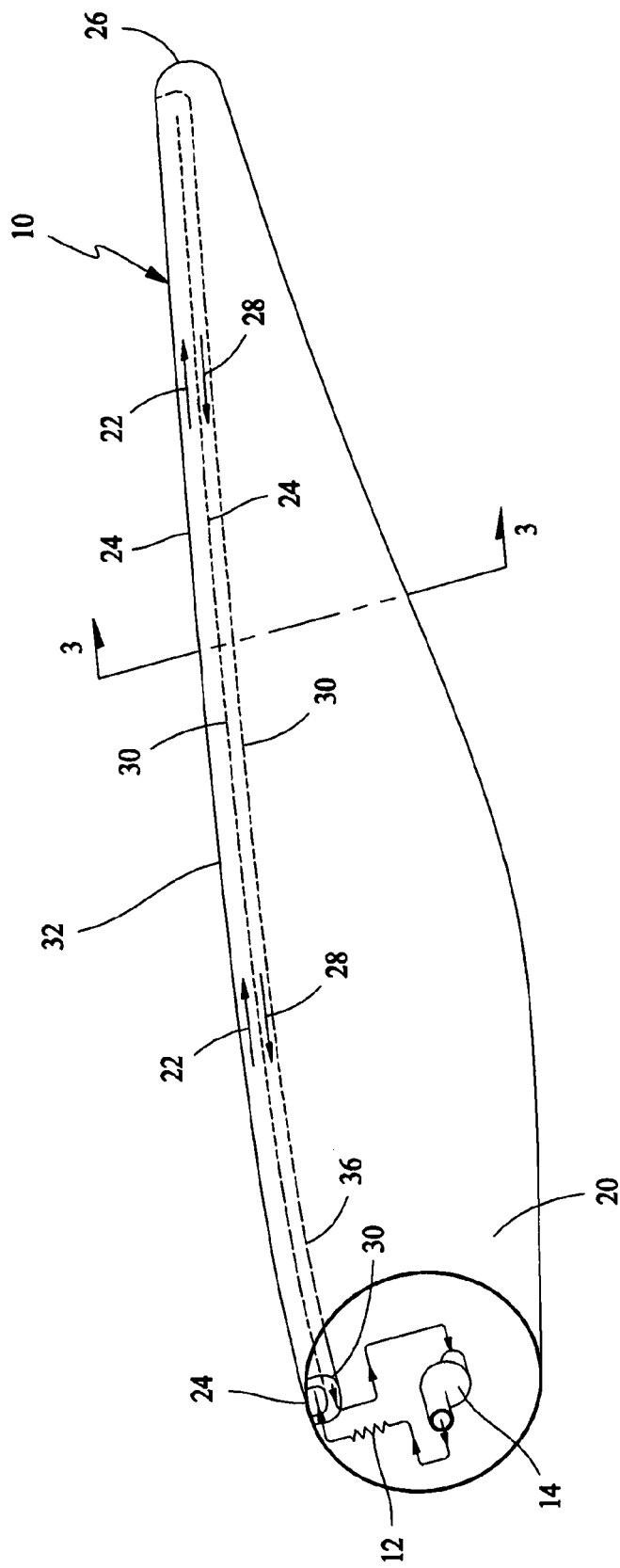
FIG. 2 is a diagrammatic view of a wind turbine rotor blade representative of various configurations of the present invention, showing air circulation channels.
Figure 3:
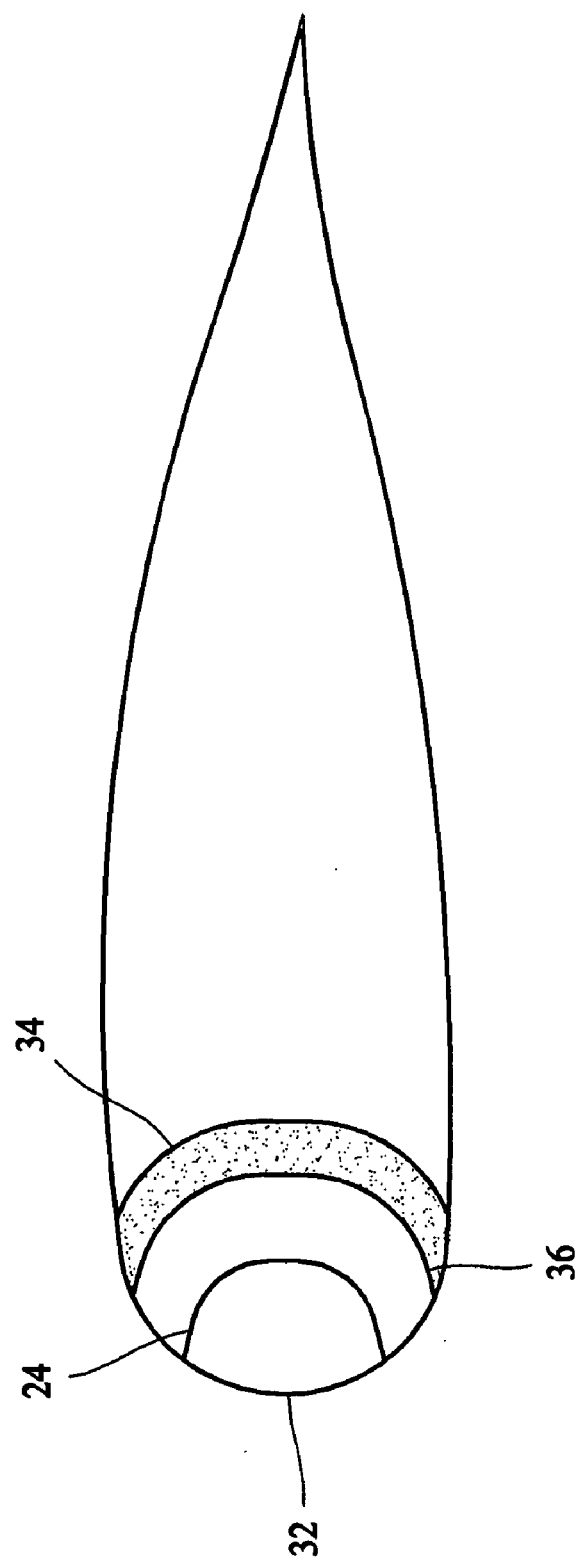
FIG. 3 is a cut-away view of the wind turbine rotor blade of FIG. 2 along line 3—3 showing the air circulation channels and insulation present in some configurations in greater detail.
Figure 4:
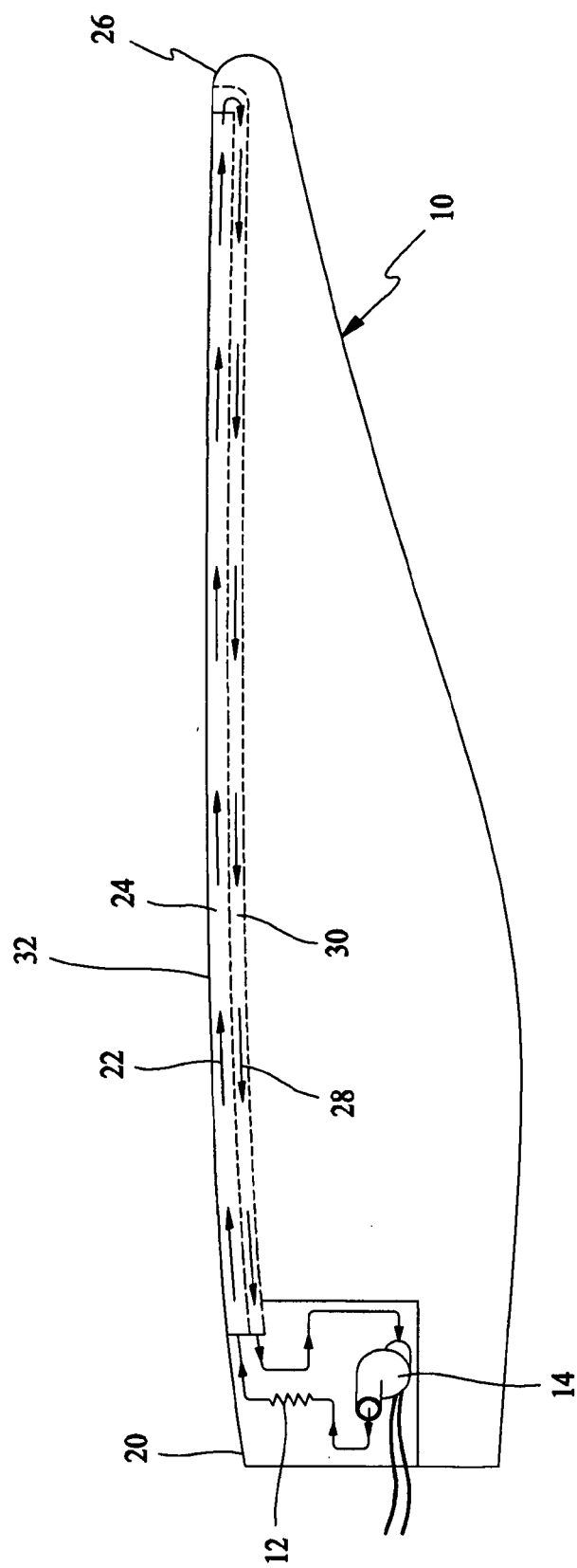
FIG. 4 is another view of the wind turbine rotor blade of FIG. 3.

In some configurations and referring to FIGS. 1, 2, and 4, the present invention employs blade heating to deice airfoils or rotor blade(s) 10 of a wind turbine 100. Nacelle 102 of wind turbine 100 may be mounted on a tall tower 104, only a portion of which is shown in FIG. 1. A resistive heating unit 12 coupled with a blower 14 is mounted in a hub 16 of a wind turbine 100 or near a blade root 20. Heated air 22 is directed through a outflow channel 24 from blade root 20 towards blade tip 26 and then recirculated 28 via a return channel 30 from blade tip 26 to blade root 20, whereupon heating unit 12 reheats the return air 28. In this manner, warm return air 28 insulates outgoing hot air 22 and heat is dissipated primarily into the leading edge 32 of rotor blade 10. In some configurations and referring to FIG. 3, Insulation 34 can be added to an outside wall 36 of return channel 30 to optimize heat transfer to leading edge 32. Electrical power is provided to resistive heating unit 12 and blower 14 via a slipring (not shown), so that rotation of hub 16 (and hence, rotor blades 10) is not impeded.

Thus, in some configurations, a rotor blade deicing system 10 comprises at least one heater element 12 located near either a rotor blade root 20 or hub 16. Heater element 12 is coupled to a blower or fan 14 to circulate heated air 22 from heater element or elements 12. Heated air 22 is then directed into a "c" channel 24 installed along leading edge 32 of rotor blade 10. The "c" channel 24 is located inside rotor blade 10. Further, "c" channel 24 forms a tube because it is bonded or otherwise attached to the inside of leading edge 32 of rotor blade 10. Therefore, in some configurations, heated air 22 flows from heating unit 12 along leading edge 32 of rotor blade 10 inside a contained tube 24. Heated air 22 flows from root 20 of rotor blade 10 towards tip 26. When heated air 22 reaches tip 26 or a point near tip 26, its flow direction is reversed by directing the flow through a return tube 30 which forms a "C" shell of "c" channel 24. Thus, in some configurations, the effect is effectively similar to a tube inside a tube or a shelled tube with the hottest air on the inside and the cooler, return air on the outside. Advantageously, heated air 28 from return path 30 partially insulates heated air 22 in outgoing path 24 and the return heated air 28 is re-heated, i.e., the air being heated is in a closed or nearly closed circuit.

In some configurations, "c" channel 24 forms a tube because it is bonded to the inside surface of leading edge 32 of rotor blade 10. Also, as used herein, a lower case "c" refers to an interior tube 24 containing the hottest heat-unit 12 discharge air 22, whereas an upper case "C" refers to the shell or exterior tube 30 enclosing a return path and containing relatively cooler air 28. Outer "C" shell 30 is insulated 34 in some configurations to reduce thermal losses to the inside of rotor blade 10. The "c" or "C" shape used in many configurations of the present invention advantageously increases or optimizes heat transfer to leading edge 32 of rotor blade 10.

A higher temperature and/or a greater volume of heated air may be required to melt blade ice under some atmospheric conditions. Therefore, heater 12 and/or blower 14 are adjustable in some configurations to adjust either or both of the volume of heated air or the temperature of the heated air in accordance with ambient atmospheric conditions to melt ice.

Figure 5:
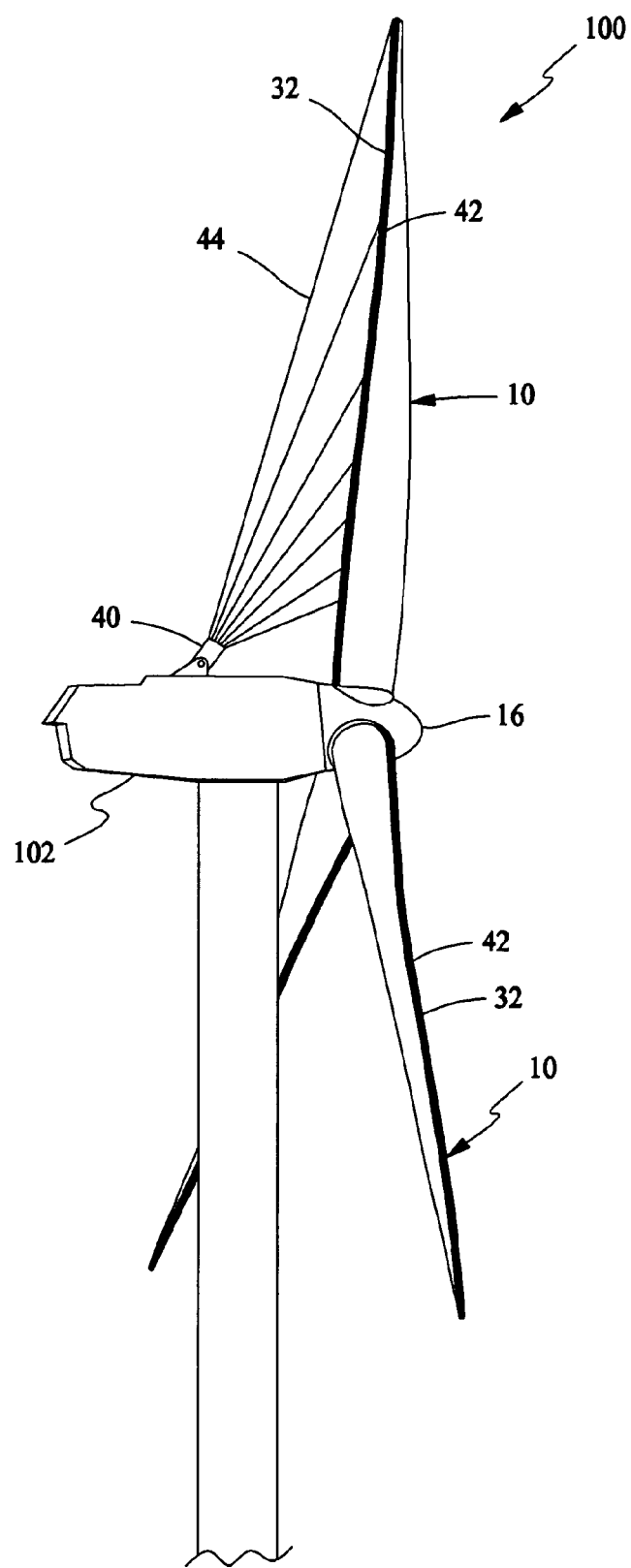
FIG. 5 is a perspective view of a wind turbine configuration that uses a thermal camera to detect icing on a leading edge of an airfoil.

In some other configurations of the present invention and referring to FIG. 5, ice is detected using a thermal camera system 40 including a thermal camera that is aimed at a leading edge 32 of rotor blade 10 and configured to detect thermal radiation from leading edge 32. The system is configured to utilize sensors (not shown) to detect or otherwise estimate or infer physical parameters that may include of thermal output, airflow rate, thermal conductivity, and/or atmospheric conditions (such as temperature and/or wind speed). These estimates or measurements of thermal parameters are used by thermal camera system 40 along with detected radiation 44 to determine icing on leading edge(s) 32 of rotor blade(s) 10. Paint 42 (e.g., black paint) applied to leading edges 32 of rotor blades 10 in some configurations allows icing to be detected with thermal camera 40 without having to pre-heat blades 10.

In some configurations, specific leading-edge zones of a rotor blade are heated. For example, in some configurations, a linear or rotational actuator is provided for the interior "c" tube or tubes. Hot discharge air that flows outward through the shell is returned via a selected path by using the actuator to rotate or move the interior "c" tube to align with a selected duct slot.

It will thus be appreciated that various configurations of the present invention are effective for deicing and/or detecting icing on rotor blades and airfoils, and are particularly useful in conjunction with wind turbines.

While the invention has been described in terms of various specific embodiments, those skilled in the art will recognize that the invention can be practiced with modification within the spirit and scope of the claims.

What is claimed is:

1. A method for deicing a rotor blade, said rotor blade having a blade root, a blade tip, a leading edge, and a trailing edge, said rotor blade operably coupled to a hub of a turbine, said method comprising:
   circulating heated air through an outflow channel from the blade root towards the blade tip wherein the outflow channel extends along the leading edge of the blade;
   recirculating the heated air via a return channel from the blade tip to the blade root, whereupon said recirculated heated air becomes returned air wherein the return channel is positioned between the outflow channel and at least a portion of a center line, said center line extending from the blade tip to the blade root between the leading edge and the trailing edge of the rotor blade;
   at least partially insulating the heated air in the outflow channel from the blade root to the blade tip utilizing the returned air; and
   using a heating element to reheat the returned air, wherein the heating element is configured to adjust at least one of a temperature or a volume of the recirculated heated air.

2. A method in accordance with claim 1 wherein said circulating heated air through an outflow channel comprises circulating heated air through an outflow channel proximate a leading edge of the rotor blade.

3. A method in accordance with claim 2 further comprising insulating at least a portion of the outside wall of the return channel.

4. A method in accordance with claim 3 wherein circulating heated air through an outflow channel further comprises heating air using a heating element located proximate either the blade root or the hub.

5. A method in accordance with claim 4 wherein circulating heated air through an outflow channel further comprises utilizing a blower or fan to circulate the heated air.

6. A method in accordance with claim 4 wherein circulating heated air through an outflow channel further comprises directing the heated air into a c-channel along the leading edge of the rotor blade.

7. A method in accordance with claim 6 wherein the c-channel is located inside the rotor blade.

8. A method in accordance with claim 6 wherein the c-channel is bonded or attached to the leading edge of the rotor blade.

9. A method in accordance with claim 6 wherein recirculating the heated air via a return channel further comprises recirculating the heated air via a shell of the c-channel.

10. A method in accordance with claim 1 wherein the rotor blade is part of a wind turbine.

11. A method in accordance with claim 1 wherein adjusting at least one of the temperature or volume of the circulated heated air comprises adjusting the temperature and volume of the circulated heated air in accordance with ambient atmospheric conditions.

12. A deicing apparatus comprising:
    a turbine or engine having a hub;
    a rotor blade operably coupled to the turbine or engine and having a blade root, a leading edge, a tip, a trailing edge, a center line extending from the blade root to the blade tip located between said leading edge and said trailing edge, an outflow channel therein from the blade root to the blade tip, and a return channel from the blade tip to the blade root located between said outflow channel and at least a portion of said center line, wherein the return channel is configured to recirculate air flowing through the outflow channel back to the blade root such that the outflow channel is at least partially insulated by the recirculating air; and
    at least one heater configured to direct heated air through the outflow channel to reheat said recirculated air and to adjust at least one of heated air volume and temperature.

13. An apparatus in accordance with claim 12 wherein said outflow channel is proximate a leading edge of the rotor blade.

14. An apparatus in accordance with claim 13 wherein at least a portion of the outside wall of the return channel is insulated.

15. An apparatus in accordance with claim 14 wherein said heater is located proximate either the blade root or the hub.

16. An apparatus in accordance with claim 14 wherein said heater comprises a blower or fan configured to circulate the heated air.

17. An apparatus in accordance with claim 14 the outflow channel is a c-channel along the leading edge of the rotor blade.

18. An apparatus in accordance with claim 17 wherein the c-channel is located inside the rotor blade.

19. An apparatus in accordance with claim 17 wherein the c-channel is bonded or attached to the leading edge of the rotor blade.

20. An apparatus in accordance with claim 17 wherein the return channel comprises a shell of the c-channel.

21. A wind turbine including the deicing apparatus of claim 12.

22. A wind turbine comprising:
a rotor including at least one blade; and
a thermal camera system comprising at least one thermal camera configured to detect thermal radiation from a leading edge of said at least one rotor blade, said thermal camera system further configured to utilize at least one sensor configured to facilitate determination of at least one of the following:
thermal output of said leading edge;
rate of airflow about said leading edge;
thermal conductivity of said leading edge;
atmospheric temperature; and
wind speed.

23. A wind turbine in accordance with claim 22 wherein said leading edge is painted black.

* * * * *